Figure 1:
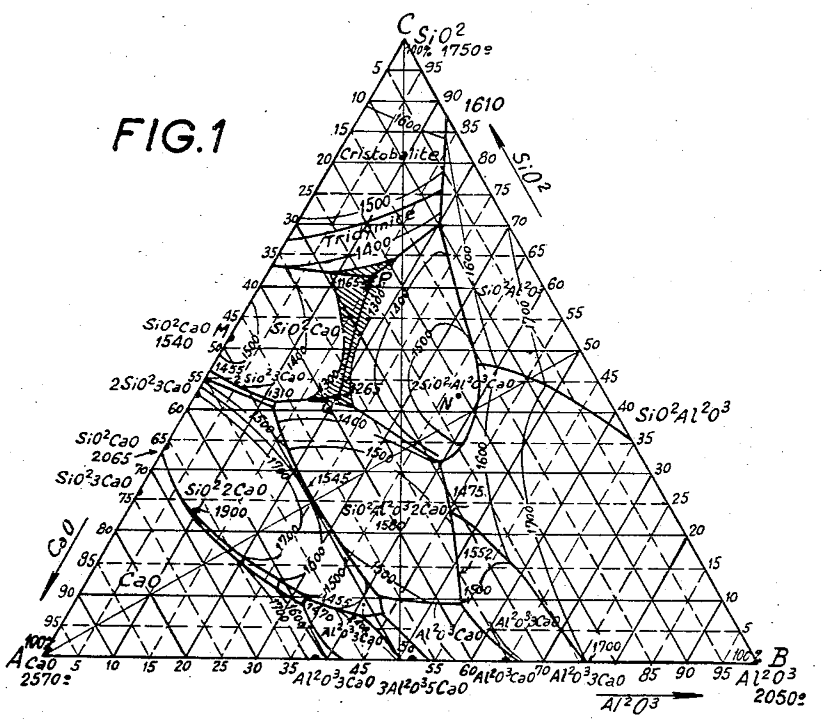

Sept. 2, 1958 A. BERTRAND 2,850,375

DRY METALLURGICAL PROCESS FOR EXTRACTING LEAD FROM ITS SULPHIDE OR OXIDIZED ORE

Filed Aug. 24, 1953 2 Sheets-Sheet 1

Sept. 2, 1958 A. BERTRAND 2,850,375

DRY METALLURGICAL PROCESS FOR EXTRACTING LEAD FROM ITS SULPHIDE OR OXIDIZED ORE

Filed Aug. 24, 1953 2 Sheets-Sheet 2

United States Patent Office 2,850,375

Patented Sept. 2, 1958

2,850,375

DRY METALLURGICAL PROCESS FOR EXTRACTING LEAD FROM ITS SULPHIDE OR OXIDIZED ORE

André Bertrand, Casablanca, Morocco

Application August 24, 1953, Serial No. 376,131

Claims priority, application Morocco August 25, 1952

5 Claims. (Cl. 75—77)

This invention relates to the metallurgy of heavy metals and it has for its object improvements to processes of the dry metallurgy of heavy metals such as lead, antimony, tin, copper and zinc. More particularly, it concerns the obtaining of these metals in the metallic state, starting from their sulphide or oxidized ores.

In the case of sulphide ores such as blende or stibnite, the liberation reaction of the metal may take place by oxidation, by oxidation-reduction or by precipitation. The last mentioned method may be accomplished by causing the ore to react on metallic iron so as to obtain the well known reaction:

$$MS+Fe \rightarrow M+FeS$$

in which M represents the heavy metal under consideration.

This process has never received any important industrial development and has always been abandoned owing to the bad yields obtained. The reaction suffers from the serious drawback of being limited by the formation of an eutectic between the iron sulphide formed and the sulphide of the treated ore, this eutectic forming a matte which carries away the metal sought in the dross and limits the quantity that is extracted.

In addition, in the case of both the sulphide and the oxidised ore, the liberated metal has always been difficult to separate from the slag owing to the lack of fluidity of the latter. Various additions have already been proposed intended to lower the melting point of the slag and to render the latter more fluid, but none of these known processes has overcome the difficulties constituted by the formation of the matte of mixed sulphide.

The present invention has for its object to provide a new process tending to overcome these difficulties by permitting simultaneously to obtain a slag which is extremely fluid and to dissociate the eutectic of mixed sulphide as it is formed. In this manner, a practically quantitative yield of the metal and an easy separation of the latter from the slag are obtained.

To this end, the invention is based on the verification that, for a very narrow range of relative proportions of lime, silica and alumina, the slag which is formed has the surprising property of causing the dissociation of the eutectic of mixed sulphide.

It so happens that, in this same range of proportions, the melting point of the slag is particularly low and corresponds to an eutectic valley on the ternary diagram. It is therefore possible to define the composition of the slag causing this decomposition of the eutectics of mixed sulphides by the zone situated in the eutectic valley of the ternary diagram comprised between $SiO_2$, CaO and $2SiO_2$, $Al_2O_3$, CaO.

The ternary diagram which has just been mentioned is well known to metallurgists. It defines the temperature of fusion of each possible composition $SiO_2$. $Al_2O_3$ and CaO. In practice, in the treatment of a natural ore, other constituents are met which may influence the temperature of fusion of the slag. However, the essential constituents of this slag are lime, silica and alumina, and the process according to the invention consist in the application of a discovery directed to the consideration of a property which is characteristic of the compounds lime-silica-alumina only.

From the above, it will be understood that, in the case of the sulphide ores, the invention consists in causing the formation of the slag referred to. However, it will be moreover noticed that, this slag being the most fluid that it is possible to obtain, it ensures a much more easy separation of the extracted metal as well in the case of the metal obtained from its sulphide as in the case of a metal obtained from an oxidised ore, for example by reduction of such an ore by means of carbon.

The process according to the invention, therefore, consists in enhancing the separation of the metal as it is formed by adjusting for this purpose the composition of the slag with respect to the initial content of the gangue in lime, silica and alumina, as well as to the composition of the ashes of the fuel used, so that the final composition of this slag with respect to lime, silica and alumina is represented by a point situated in the eutectic valley of the ternary diagram comprised between the combinations $SiO_2$, CaO and $2SiO_2$ $Al_2O_3$, CaO.

Referring now to the ternary diagram as represented in Fig. 1 of the appended drawing, it will be seen that, by marking on the three sides of the equilateral triangle ABC increasing percentages of alumina, silica and lime, each point in this triangle corresponding to a particular combination having given proportions of these three constituents and the melting point of this compound being indicated, there exists on the side AC a point M corresponding to the compound $SiO_2$, CaO and, in the inside of the triangle, a point N corresponding to the compound $2SiO_2$, $Al_2O_3$, CaO. The melting points of these two compounds, respectively, are higher than 1500° C. If however the region between M and N is considered, isothermal curves are observed in that region corresponding to lower temperatures, namely 1400 and 1300° C. There are in fact two 1300° C. isothermals, between which there happens to be a eutectic valley PQ, itself limited by two other eutectic curves and the melting point of which is comprised between 1165° C. (for P) and 1265° C. (for Q). The invention consists in the discovery that, if the composition of the slag is so adjusted that the point representing it is situated in the shaded zone of the ternary diagram surrounding the valley PQ, and more particularly limited by the 1300° C. isothermals, the dissociation of the eutectic PbS–FeS, for example, is brought about, while an extremely fluid slag is obtained, which ensures an easy separation of the metal extracted.

According to an important characteristic feature of the invention, the process previously mentioned must therefore be limited to the adjustment of the composition of the slag to the zone aforesaid, namely, that limited by the 1300° C. isotherms.

In carrying out the invention in practice, it is only necessary to perform an analysis of the gangue of the ore and of the ashes of the fuel used. With the result of this analysis, together with the percentage of gangue of the ore and the quantity of fuel added for the treatment of this ore, the nature and the quantity of the components to be introduced in order to bring the composition of the slag in the zone aforesaid may be deduced therefrom. This may be obtained either by calculation or by a very simple graphical construction, which will be now explained with reference to the following example.

*Example*

| | Percent |
|---|---|
| Pb | 68 |
| $SiO_2$ | 8 |
| $Al_2O_3$ | 2 |
| CaO | 1 |

In order to maintain a reducing atmosphere, 10% of coke dust is added to the ore, having the following composition:

| | Percent |
|---|---|
| $H_2O$ | 1 |
| Volatile matters | 2 |
| Fixed carbon | 82 |
| $SiO_2$ | 7 |
| $Al_2O_3$ | 5 |
| CaO | 2 |
| $Fe_2O_3$ | 1 |

The composition of the lime which can be used is as follows:

| | Percent |
|---|---|
| CaO | 86 |
| $SiO_2$ | 5 |
| $Al_2O_3$ | 2 |
| $Fe_2O_3$ | 1 |

The quantity of metallic iron to be added as a function of the percentage of lead existing in the form of PbS in the ore is calculated from the equation $$PbS + Fe \rightarrow Pb + FeS$$

This quantity of iron is equal to 0.27 times the quantity of lead. It does not in any way alter the calculation of the slags and in what follows only the quantity of silica, lime and alumina used are taken into consideration.

To this end, the percentages of raw materials will be given in the following table, taking into account the fact that the lead ore contains 11% gangue, the fuel contains 14% gangue and the lime contains 93% of products with which the diagram is concerned. Bringing these quantities to 100%, the three points of the diagram corresponding to the three gangue compositions are ascertained.

| | Point R<br>Lead ore | Point S<br>Fuel | Point T<br>Lime |
|---|---|---|---|
| $SiO_2$ | 73 | 50 | 5.4 |
| $Al_2O_3$ | 18 | 35.7 | 2.1 |
| CaO | 9 | 14.3 | 92.5 |

Figure 2:
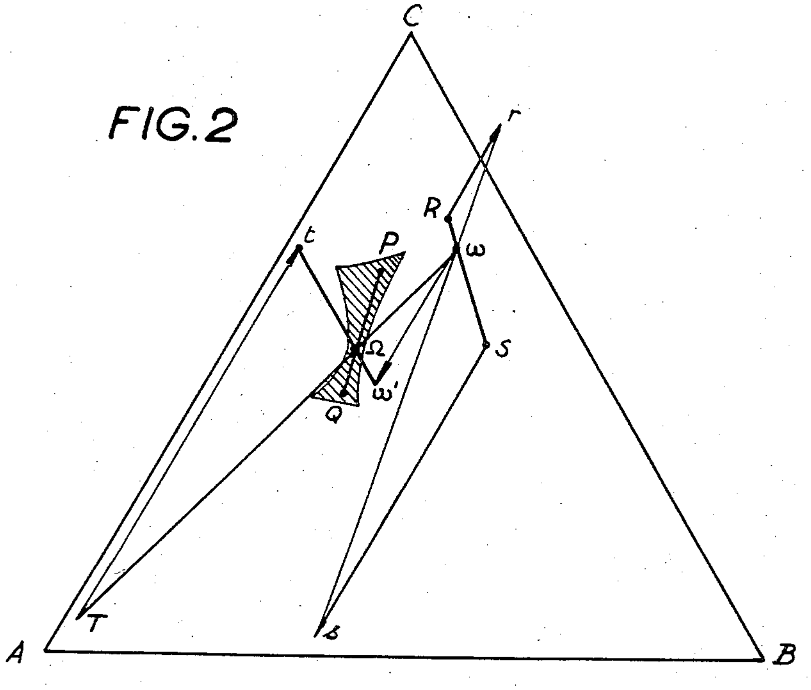

In order to find the composition of the slag obtained without any other addition than the ore and the fuel, a graphical construction, represented in Fig. 2, may be used. The points R, S and T having been plotted on the ternary diagram, from the points R and S parallel vectors R$r$ and S$s$ are drawn, having respectively a length inversely proportional to the mass of the fuel gangue and to the mass or the ore gangue. By joining $rs$, the point $\omega$ is obtained, which represents the composition of the slag as a function of the quantities of the compounds having the compositions represented by the points R and S. This point $\omega$ is situated outside the zone surrounding the valley PQ and the invention consists in adding lime (having the composition represented by T) in such quantity that the resulting slag will have a composition represented by a point situated in that zone. To do this, a vector T$t$ proportional to the total of the quantities of ore and fuel is drawn and the line T$\omega$ is drawn, intersecting PQ at $\Omega$. The points $t$ and $\Omega$ are then joined and the line $t\Omega$ is produced till it meets at $\omega'$ a line parallel to T$t$ drawn through $\omega$. The value of the vector $\omega\omega'$ gives the proportion of lime having the composition given above which it is necessary to add to obtain the desired slag.

Naturally, the same result could be obtained by calculation, and this can be performed in a very simple manner: measuring the lengths of the lines $\Omega\omega$ and $\Omega$T enables the weight $x$ of lime to be added to be found. For the point $\Omega$ representing the final slag must satisfy the equation $$(\text{Weight of ore} + \text{weight of fuel}) \times \Omega\omega = T\Omega \times x$$

whence the value of $x$ is deduced.

It will be noticed that neither the construction nor the calculation introduces the fact that the ore is a sulphide or an oxide or is of any other nature, so that the present process is applicable to any ore, its utility being greater in the case of a sulphide ore, however, since not the fluidity of the slag enables a better separation of the metal to be obtained, but also its nature ensures the quantitative yield of the reaction by dissociating the mixed sulphide formed.

The process described above is preferably applicable to lead, antimony and tin. It may also be used, but not so advantageously, in connection with copper and zinc ores.

Should the slag not yet be sufficiently fluid at the very low tempertures such as 1100 to 1280° C., 1 or 2% of fluor-spar or sodium carbonate may be added.

What I claim is:

1. In a dry metallurgical process for the extraction of lead from its ore; the step of adjusting the composition of the slag formed at the end of the process by adding to the ore and fuel a compound of lime, silica and alumina the proportions of which are so related with respect to the initial content of the ore gangue and of the content of lime, silica and alumina in the ashes of the fuel that the final composition of the slag in lime, silica and alumina is represented by a point of the ternary diagram showing the temperatures of fusion of the various possible compositions of $SiO_2$, $Al_2O_3$ and CaO, which point is situated in the eutectic valley comprised between the combinations $SiO_2$, CaO and $2SiO_2$, $Al_2O_3$, CaO, in a section of said eutectic valley defined by the two 1300° C. isotherms whereby the slag has a great fluidity.

2. In a dry metallurgical process for the extraction of lead from its ore; the step according to claim 1, wherein the lead is present in a sulphide ore, and is extracted by the reaction thereof on metallic iron, with the separation of the metal from the slag being enhanced by the simultaneous dissociation of the eutectic of mixed sulphide formed during the process.

3. In a dry metallurgical process for the extraction of lead from its ore; the step according to claim 1, wherein the lead is present in a sulphide ore, and is extracted by the reaction thereof on metallic iron, with the separation of the metal from the slag being enhanced by the fluidity of the eutectic slag.

4. In a dry metallurgical process for the extraction of lead from its ore; the step according to claim 1, wherein the lead is present in galena and is extracted from the latter by the reaction thereof on metallic iron.

5. In a dry metallurgical process for the extraction of lead from its ore; the step according to claim 1; wherein the lead is present in an oxidized ore reduced by means of carbon, with the separation of the liberated lead from the slag being enhanced by the fluidity of the eutectic slag.

References Cited in the file of this patent

UNITED STATES PATENTS

| | | |
|---|---|---|
| 816,772 | Betts | Apr. 3, 1906 |
| 2,727,815 | Kjellman | Dec. 20, 1955 |

OTHER REFERENCES

Handbook of Nonferrous Metallurgy, II, Recovery of the Metals, Liddell, second ed., 1945, pp. 159, 160, 162.